United States Patent [19]

Rohde et al.

[11] Patent Number: 4,520,308

[45] Date of Patent: May 28, 1985

[54] PROCESS AND DEVICE FOR THE NONDESTRUCTIVE MEASUREMENT OF MATERIAL ACCUMULATIONS OR COATING THICKNESSES ON DIELECTRIC MATERIALS, IN PARTICULAR PLASTIC

[75] Inventors: Thomas Rohde, Meinerzhagen; Friedhelm Caspers, Bochum, both of Fed. Rep. of Germany

[73] Assignee: Elektro Physik Hans Nix & Dr. Erich Steingroever, Cologne, Fed. Rep. of Germany

[21] Appl. No.: 415,384

[22] Filed: Sep. 7, 1982

[30] Foreign Application Priority Data

Sep. 5, 1981 [DE] Fed. Rep. of Germany ....... 3135263

[51] Int. Cl.³ ............................................. G01R 27/04
[52] U.S. Cl. ............................................. 324/58.5 R
[58] Field of Search .................... 324/58.5 R, 58.5 B, 324/58.5 A

[56] References Cited

U.S. PATENT DOCUMENTS

| 3,490,037 | 1/1970 | Williams | 324/58.5 B |
| 4,054,255 | 10/1977 | Magenheim | 324/58.5 B X |
| 4,104,584 | 8/1978 | Miyai et al. | 324/58.5 R |

Primary Examiner—Stanley T. Krawczewicz
Attorney, Agent, or Firm—Fisher, Christen & Sabol

[57] ABSTRACT

A process and apparatus for the non-destructive measurement of the thickness of sheets or hollow bodies made of dielectric materials, such as plactis, makes use of a microwave frequency signal which is fed to an elongated microwave strip line which is placed either close to, or in contact with, the material to be measured, whereby the change in the propagation time of the signal represents the thickness, or the filling factor of the measured material. In the case of hollow bodies the strength of the signal is insufficient to be affected by the wall of the body remote from the conductor, and an advantage of the system is that it can be used to measure plastic materials while in a plastic state while in the process of extrusion.

15 Claims, 6 Drawing Figures

PROCESS AND DEVICE FOR THE NONDESTRUCTIVE MEASUREMENT OF MATERIAL ACCUMULATIONS OR COATING THICKNESSES ON DIELECTRIC MATERIALS, IN PARTICULAR PLASTIC

BACKGROUND OF THE INVENTION

The invention concerns a process for the nondestructive measurement of material accumulations or coating thicknesses on materials with a hollow or open cross section consisting of sheet, strip, or profiled materials, and also concerns devices for the implementation of the measuring process.

For the nondestructive measurement of materials with an open cross section, such as sheet, strips, or the like, nondestructive measuring processes are known that are based on the absorption of X-rays or which function with the radiation from radioactive sources. These processes have the disadvantage that endangerment of the operating personnel is possible, in particular, in the case of damage to the measuring apparatus, and they therefore require particularly costly precautionary measures that must satisfy the legal restrictions.

Also known for the nondestructive measurement of materials with an open cross section are processes that are based on the principle of the mechanical displacement pickup, or the principle of magnetic induction or eddy currents. These processes require counterpressure of the material under test against a substrate by means of the measurement probe; therefore, they are less suitable for the measurement of materials under test that are plastic at the time of measurement.

In the measurement of materials with a hollow cross section, such as hollow profiles, parasons, or such, with the aid of conventional processes, particularly in the case of small cross sections, there is a falsification of the measurement result due to the presence of layers adjacent to the layer to be measured such as opposing layers. The arrangement of a second measuring probe in the interior of the profile for the avoidance of this effect is in most cases not possible for mechanical reasons.

BRIEF SUMMARY OF THE INVENTION

An object of the invention is to create a relatively simple and exact process for the electronic measurement of the thickness or accumulation of material on dielectric materials that, in particular, makes possible nondestructive measurement from the outside of closed profiles and sheets.

This problem, in accordance with the invention, is solved by virtue of the fact that the change in propagation time of an microwave on a microwave strip line, due to the presence of the material to be tested, is used as a measure of the particular layer thickness or filling or volume factor of the material to be measured.

For the purpose of this disclosure the filling factor F can be considered as a number varying between 0 and 1; it is the quotient of the existing amount of material in a certain volume and the maximum amount of that material, possible in that volume. For instance, if a solid plastic block has a usual filling factor F of nearly 1, then the filling factor F of the foamed plastic is in the range of 0.01 and 0.10.

The device for the implementation of the process in accordance with the invention is characterized by the fact that it consists of a microwave strip line and a device for the determination of the change in propagation time on the microwave strip line.

In the case of the measuring process in accordance with the invention, utilization is made of the effect by virtue of which the propagation time of a microwave on a microwave strip line changes upon approaching objects consisting of dielectric material. In the case of constant operational frequency, the change in propagation time on the microwave strip line is proportional to the change in phase shift with respect to a reference phase given to a microwave that has passed through the microwave strip line.

The relationship between the change in phase shift and layer thickness or filling factor of the material under test can be represented as follows:

$$\Delta\phi = 1 \cdot f_1(D) \cdot f_2(F) \cdot f_3(A) \cdot f_4(\epsilon_r)$$

in which
  $\Delta\phi$ = change in phase shift
  $l$ = length of strip line
  $D$ = layer thickness of material under test
  $F$ = filling factor of material under test
  $A$ = distance from surface of material under test to strip line
  $\epsilon_r$ = dielectric constant of material under test
  $f_1$–$f_4$ = real functions The functions $f_1$ to $f_4$ cannot be given in a closed form; using mathematical numerical processes, however, they can be approximated with arbitrary precision. The functions $f_1$ to $f_4$ are monotonic; the following statements may be made:
  —D increases⇌$\Delta\rho$ increases
  —F increases⇌$\Delta\rho$ increases
  —A increases⇌$\Delta\rho$ decreases
  —$\epsilon_r$ increases⇌$\Delta\rho$ increases That is to say, $f_1$, $f_2$, $f_4$ are monotonically increasing, and $f_3$ is monotonically decreasing.

If one holds all these variables constant except for the layer thickness D, then the change in phase shift $\Delta\phi$ is a measure of the phase thickness D of the layer to be measured. If one holds all variables constant except for the filling factor F, then the change in phase shift $\Delta\phi$ is a measure of the filling factor F of the layer to be measured.

The advantages of the process in accordance with the invention lie in the fact that a nondestructive and continuous measurement of layer thicknesses and filling factors is possible on dielectric materials, in particular plastic, in sheets, strips or profiled materials with hollow or open cross section, without endangerment of the operating personnel in the case of inappropriate use or damage to the measuring apparatus. In particular, there is the possibility of non-destructive and continuous measurement of extruded profiles even at their exit from the extruder and before winding, and without penetration into the interior of the profile.

A further advantage lies in the fact that there is the possibility of measurement of materials that are plastic at the time of measurement without exertion of mechanical pressure from the measuring head, so that there is no deformation of the material under test due to the measuring apparatus.

The measurement is carried out in the case of hard materials in contact or without contact with a constant distance of a few $\mu$m between the microwave measuring head and the material under test. In the case of plastic material, the measurement is effected in contact over the entire surface.

Further details and advantages of the invention will be seen from the following description of schematically represented examples of measuring devices for the implementation of the measuring processes in accordance with the invention shown in the drawings.

DETAILED DESCRIPTION OF THE INVENTION

Figure 1:
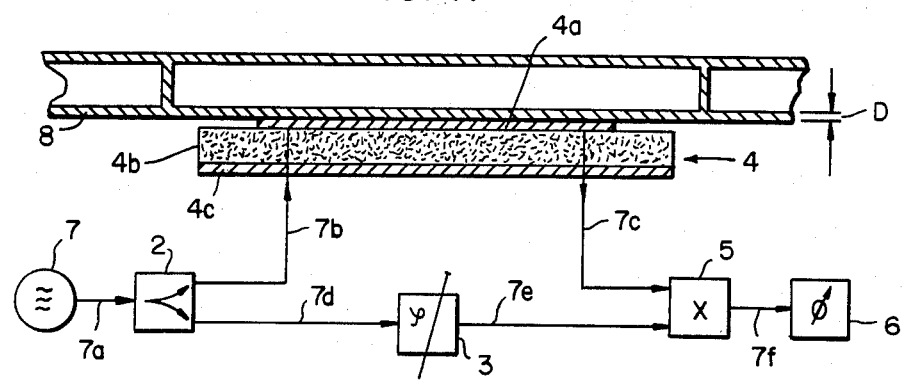
FIG. 1 is a schematic diagram of a preferred form of microwave circuit for measuring dielectric materials including a vertical cross-section of a measuring head taken on the line I—I of FIG. 2.
Figure 2:
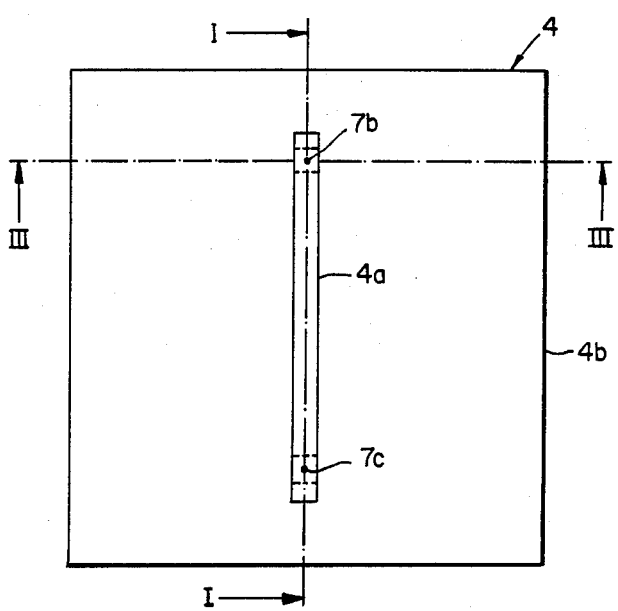
FIG. 2 is a plan view of the measuring head of FIG. 1.
Figure 3:
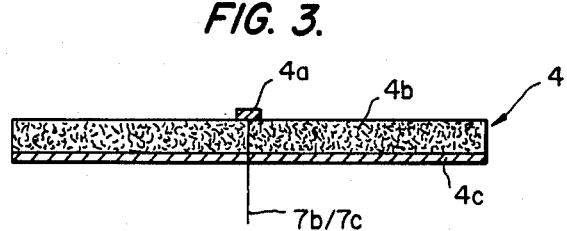
FIG. 3 is a cross-section of the measuring head taken on the line III—III of FIG. 2.

The measuring device shown in FIGS. 1-3 comprises essentially a microwave oscillator 1 acting as a signal source which is connected by coaxial line 7a to a microwave power divider 2 having an output connected by coaxial line 7b to one end of a microwave strip line 4, consisting of an elongated electrically conductive strip 4a mounted on one side of an electrical insulating and non-lossy substrate 4b which on its other side is provided with an electrically conductive and electrically grounded layer 4c.

Another output of signal divider 2 is connected by coaxial line 7d to an adjustable phase shifter 3, while the output of the phase shifter and the strip 4a are fed by respective coaxial lines 7e and 7d to the inputs of a microwave mixer 5, whose output is connected by coaxial line 7f to a processing and indicating unit 6. The material, or object, under test is indicated by numeral 8 while the layer whose thickness, or filling factor F, is to be measured is indicated by the letter D. The microwave oscillator 1 may have an oscilative frequency of between 0.1 and 100 GHz, preferably between 8 and 18 GHz. For better evaluation of the measurement signal, the oscillator 1 may include means whereby it may be amplitude-modulated at a frequency in the range of between 10 and $10^7$ Hz, and preferably in the range of 1 and 10 kHz.

In the case of the measuring devices shown in the drawing, the change in propagation time of an emitted microwave on a microwave strip line due to the presence of a material to be measured is used as a measure of the particular layer thickness "D" to be measured or of the particular filling or volume factor "F" to be measured of the material under test, as is explained in greater detail below.

Elements 1, 2, 3, 5 and 6 of the measuring device are used for the determination of the change in propagation time of a microwave on the microwave strip line 4. Let us describe below the paths of the signals in the measuring device. The output signal of the microwave oscillator 1 is split in the power divider 2 and is fed, in equal parts, to the microwave strip line 4 and the adjustable phase shifter 3. The output signals of the microwave strip line 4 and phase shifter 3 are fed to the two inputs of the mixer 5. The output signal of the mixer then goes to further processing and indication on the processing and indicator unit 6.

By appropriate one-time adjustment of the phase shifter 3 one can achieve the following:

$$\bar{u}_a = k \cdot \sin \Delta \psi$$

in which
 $\bar{u}_a$ = mean value of output voltage of the mixer 5
 $\Delta \psi$ = additional phase shift in measurement branch 7b, 4a, 7c caused by the material under test
 k = constant or calibration factor By way of approximation, in the case of small phase shifts, the following applies:

$$\bar{u}_a \approx k \cdot \Delta \rho$$

Thus in the case of constant distance of the material or object 8 to be measured from the microwave strip line 4, e.g. a zero distance, and a constant dielectric constant $\epsilon_r$ of the material to be measured, the output voltage $\bar{u}_a$ is a measure of the layer thickness "D" of the directly adjacent layer surface or of the filling factor F.

Figure 4:
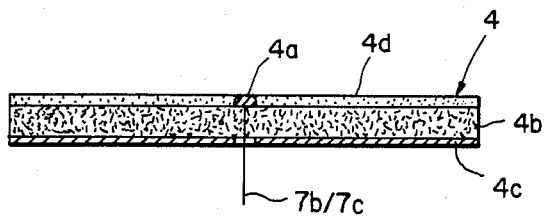
FIG. 4 is cross-section of a modified form of measuring head.

Mechanical abrasion of the measuring head 4 due to the material under test 8 in contact operation, may be avoided by an applied hard, electrically insulating coating composition 4d including a material, such as silica, to the surrounding area of the substrate 4b, as is represented in FIG. 4.

Figure 5:
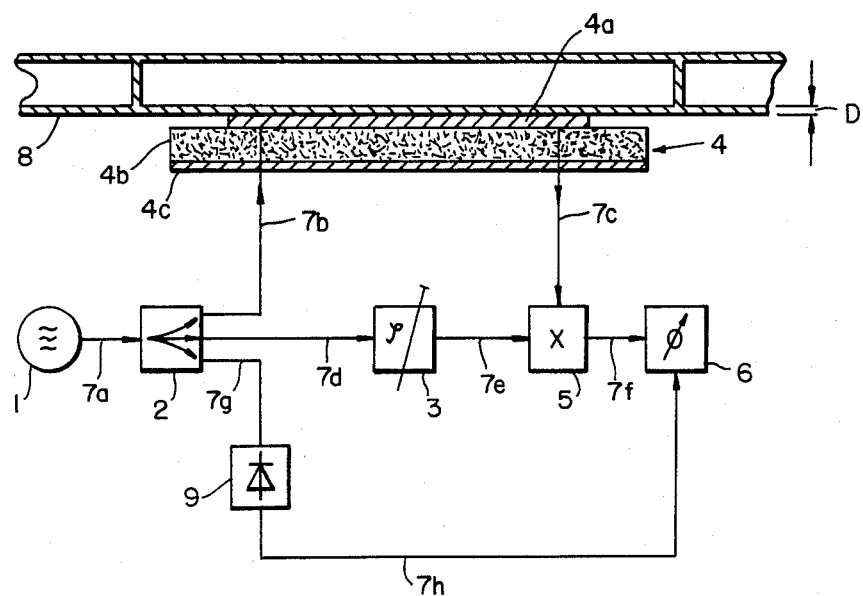
FIG. 5 is a modified form of schematic microwave circuit.

The output voltage $\bar{u}_a$ is dependent on the output amplitude of the microwave oscillator 1. In order to eliminate this effect, the output amplitude of the microwave oscillator 1 may be employed as a reference standard for the output voltage $\bar{u}_a$ of the mixer 5, as shown in FIG. 5. For this purpose, from the output signal of the high-frequency oscillator 1, via the power divider 2, a portion of the output is removed, and fed via a conductor 7g to a detector 9 for rectification and, via conductor 7h, is further fed to the processing and indicator unit 6.

A characteristic property of the invention lies in the fact that the measurement can be effected from one side of the object being tested so that, in particular, hollow profiles can be measured. By appropriate confirmation of the geometric dimensions of the elements 4a, 4b, and 4c, of the microwave strip line 4, the effective range of the electromagnetic field of the microwave strip line can be varied, so that only the layer thickness "D" or the filling factor "F" of the layer to be measured is determined adjacent or opposing layers are not noticeably picked up by the electromagnetic field of the microwave strip line 4, and do not affect the result of the measurement.

Figure 6:
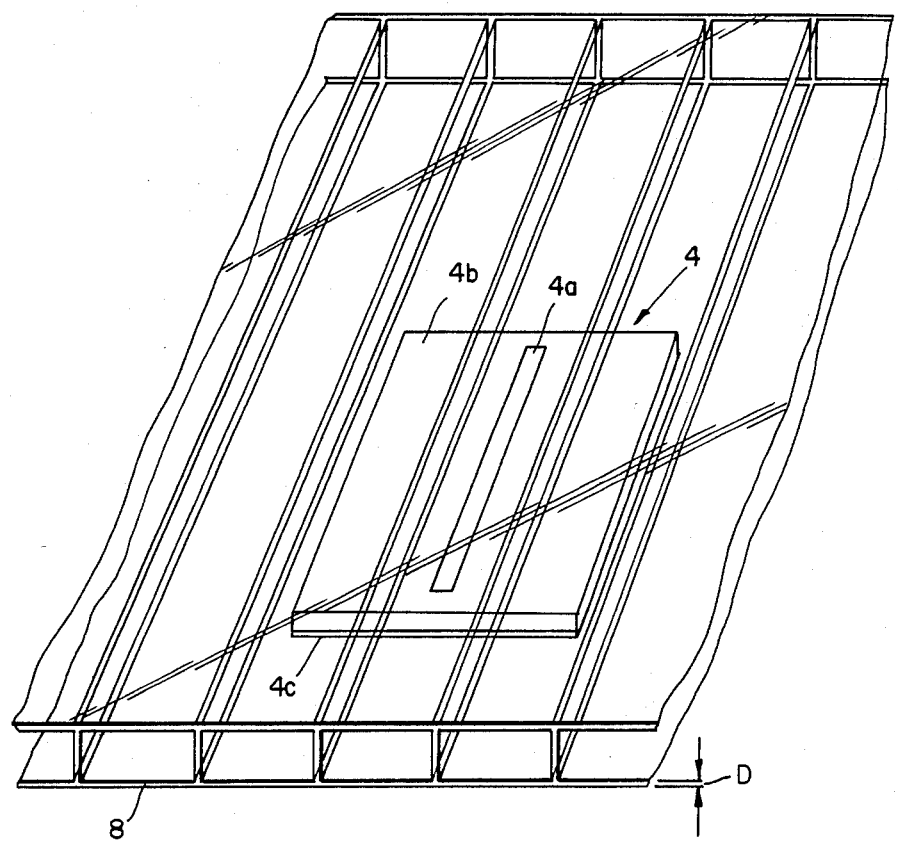
FIG. 6 is a perspective view of another modification of the invention.

In the measurement of narrow hollow profiles, a masking of profile components not to be determined in the material or object under test is achieved by arrangement of the conductive strip 4a parallel to the longitudinal structure of the hollow profile, preferentially on the direction of extrusion as is represented in FIG. 6. In the case of the measurement of sheet or strip materials without pronounced longitudinal structure, such an arrangement is not necessary.

It will therefore be apparent that the invention discloses a process and apparatus for the nondestructive measurement of material accumulations or layer thicknesses on sheet, strip, or profiled materials with hollow or open cross section, consisting of dielectric materials, by means of microwaves, in which case the change in propagation time of an microwave on a microwave strip line due to the presence of the material under test is used as a measure of the particular layer thickness to be measured or the filling factor or volume factor of the material under test. It is possible to carry out nondestructive and continuous measurements without endangerment of the operating personnel in the case of inappropriate utilization or damage to the measuring apparatus. In particular, it is possible to carry out the measurement of hollow extruded profiles even upon exit from the extruder and before winding, nondestructively, continuously and without insertion into the interior of the profile, and materials that are still plastic at the time of measurement can be measured without the exertion of mechanical pressure due to the measuring head, so that there is no deformation of the material under test due to the measuring apparatus.

What is claimed is:

1. Process for the non-destructive measurement of material accumulations or material thicknesses of a sheet of dielectric material such as plastic, comprising the steps of:
    generating an alternating current signal at a microwave frequency;
    feeding said generating signal to an elongated microwave strip line conductor placed adjacent the surface of a sheet of material whose characteristic is to be measured; and,
    detecting the change in propagation time of the microwave on said strip line as a function of said characteristic.

2. Process according to claim 1, wherein the characteristic to be measured is the thickness D of said sheet.

3. Process according to claim 2, wherein said strip line is in contact over its entire surface with the surface of said sheet.

4. Process according to claim 3, wherein the cross-section of said sheet of material is hollow.

5. Process according to claim 1, wherein the characteristic to be measured is the filling factor F.

6. Process according to claim 5, wherein said strip conductor is in contact over its entire surface with the surface of said sheet.

7. Process according to claim 6, wherein the cross-section of said sheet of material is hollow.

8. Process according to any one of claims 1, 2, 3, 4, 5, 6 or 7, wherein said microwave frequency is between 0.1 and 100 GHz.

9. Process according to claim 8, wherein said microwave frequency is amplitude-modulated by a frequency in the range of 10 to $10^7$ Hz.

10. Apparatus for measuring thickness or material accumulation of a sheet of dielectric material such as plastic, comprising:
    a microwave strip line; and
    means to determine the change in propagation time of a signal supplied to said strip line as a function of said characteristic being measured.

11. Apparatus according to claim 10, wherein said microwave strip line comprises an elongated electrically conductive strip, which is mounted on one surface of a substrate of electrically insulating non-lossy material, the opposite surface of said substrate being covered with an electrically conductive and electrically grounded layer.

12. Apparatus according to claim 11, wherein the surface adjacent to the object under test is covered with an abrasion-resistant composition.

13. Apparatus according to claim 12, wherein said abrasion-resistant composition includes silica.

14. Apparatus according to any one of claims 10, 11, 12 or 13, wherein said means to determine the change in propagation time on said microwave strip line includes to supply a signal at a microwave frequency includes means for amplitude modulation of the supplied signal at a frequency less than approximately $10^7$ Hz.

15. Apparatus according to claim 14 wherein said means to determine the change in propagation time includes processing and indicating circuit means, and said amplitude-modulated signal is utilized by said processing and indicating circuit means as a reference standard for determining said characteristic being measured.

* * * * *